Nov. 27, 1973   H. W. BENEZE   3,775,528
PROCESS OF MAKING A PNEUMATIC TIRE
Filed July 23, 1970   4 Sheets-Sheet 2

Nov. 27, 1973 H. W. BENEZE 3,775,528
PROCESS OF MAKING A PNEUMATIC TIRE
Filed July 23, 1970 4 Sheets-Sheet 2 ced Nov. 27, 1973

3,775,528
PROCESS OF MAKING A PNEUMATIC TIRE
Heinz Wilhelm Beneze, Akron, Ohio, assignor to The Firestone Tire & Rubber Company, Akron, Ohio
Filed July 23, 1970, Ser. No. 57,736
Int. Cl. B29c 17/12; B29h 5/04, 17/28
U.S. Cl. 264—162     3 Claims

ABSTRACT OF THE DISCLOSURE

A process of making a pneumatic tire which includes the steps of preparing a pneumatic tire tread of conventional tread stock which tread has an outer surface for engaging the road in a finished tire and which has an inner surface to which is adhered a breaker of rayon, nylon or polyester fabric or cord. The fabric or cord is buffed to break open the fibers. The so prepared tread is then placed into a mold which is formed to the shape of a pneumatic tire and a hardenable liquid polymeric material is introduced into the mold which mold forms the side-walls and crown portion of the pneumatic tire. The preferred resinous polymeric material is polyurethane and is introduced into the mold by what is commonly referred to as centrifugal casting and the polymeric material then surrounds the broken fibers of the fabric or cord. The resinous polymeric material is then cured to produce both a chemical and mechanical bond with the fabric or cord.

---

The abrasion resistance of pneumatic tires which are capable of being formed by centrifugal casting of polymeric materials, is in many instances quite unsatisfactory. The most common tire constructed of this material is of a material known as polyurethane. There have been many attempts made to attach a tread of conventional tread stock construction, which has highly acceptable abrasion resistance, to a polyurethane tire body. These two materials have a very poor adhesion to each other and some of these above referred to attempts have involved mechanical type interlocking systems. While these systems have proved satisfactory in many respects there have been some difficulties encountered.

The present invention has to do with a process producing a conventional tread construction and even more importantly the present invention has to do with a chemical and mechanical means of bonding a tread of conventional tread stock construction to a polyurethane tire carcass. The invention involves itself by utilizing an intermediate member or material which adheres as well to the tread stock material as to the polyurethane itself. The intermediate member or substance is a breaker of rayon, nylon or polyester cord or fabric which is attached to the conventional tread stock by utilizing conventional cord dips containing for example a resorcinol-formaldehyde resin and a latex. The adhesion to the polyurethane material is obtained by buffing to the desired degree, the cord or fabric breaker so as to break open the fibers which make up the breaker and then the polyurethane material is centrifugally cast into contact with the buffed cord material. The polyurethane is cured, thereby creating both a mechanical bond as well as a chemical bond which results because of the reaction of the isocyanate end groups of the polyurethane with the active hydrogen of rayon, nylon and polyester materials. In the rayon material the reaction with the isocyanate groups is by means of the OH groups. Nylon is somewhat less reactive having amide groups ($CONH_2$), and in the case of the polyester material, the reactive groups are OH groups and COOH groups which are primarily at the ends of the chains and hence any given chain has fewer sites for bonding. In any event, regardless of the precise chemical reaction occurring, there is produced by the process of the present invention an excellent chemical and mechanical bonding between a tread of conventional tread stock and a carcass constructed of a castable polyurethane material.

Other objects and a fuller understanding of this invention may be had by referring to the following description and claims, taken in conjunction with the accompanying drawings, in which:

Figure 7:
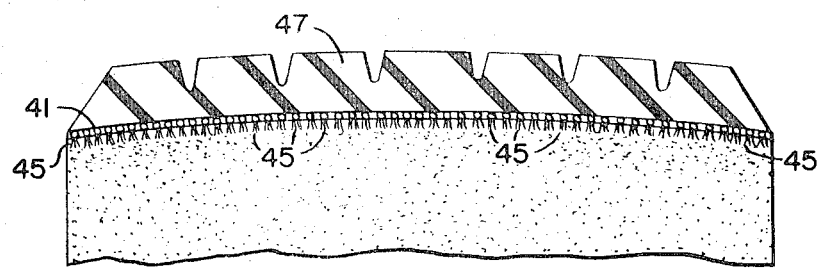
FIG. 7 is an enlarged fragmentary view partially in section of the tread which is removed from the mold of FIG. 6 with the inner surface of the breaker having been buffed to break open and expose the fibers of the breaker material.

FIGS. 1 through 6 show the tread molding apparatus 20 for producing a finished tread of conventional tread stock material, best illustrated in FIG. 7. The finished tread is then utilized in the apparatus of FIGS. 8 and 9 to produce the finished pneumatic tire (FIGS. 10 and 11) which will be discussed and described more fully hereinafter. It will be readily appreciated that the tread molding apparatus 20 illustrated in FIGS. 1 through 6 is susceptible of making a tread which not only can be utilized in the apparatus of FIGS. 8 and 9 but which might as readily be utilized in retreading in conventional retreading type molds.

Figure 1:
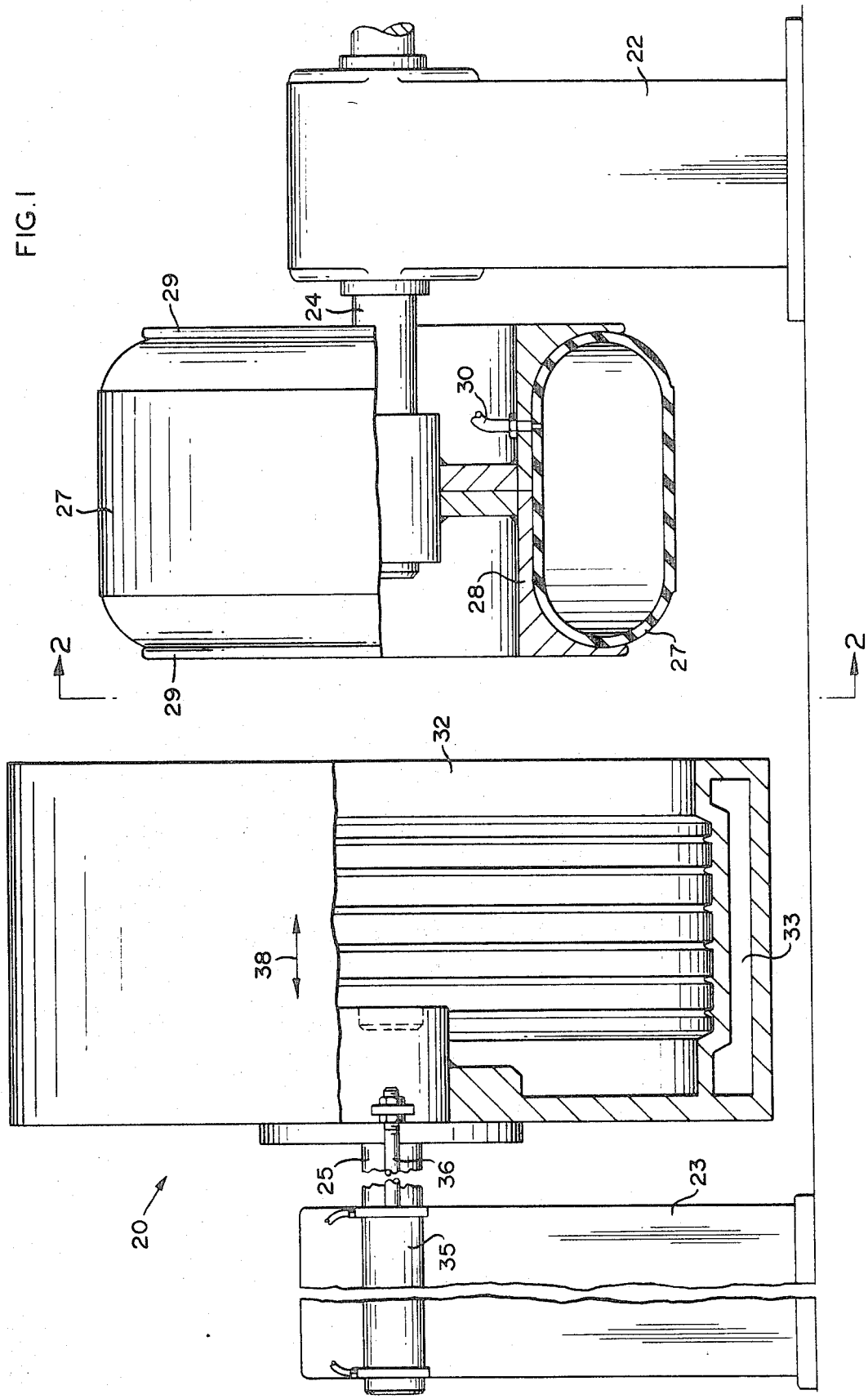
FIG. 1 is an elevational view partially in section of apparatus for producing the tire tread of the present invention.
Figure 2:
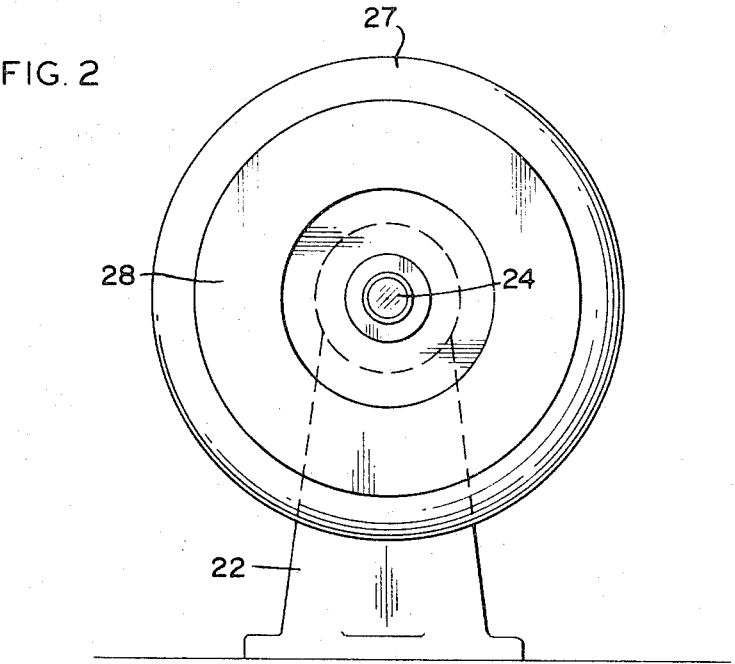
FIG. 2 is a view taken generally along the line 2—2 of FIG. 1.

In any event, the tread molding apparatus 20 includes in general pedestals 22 and 23 with pedestal 22 mounting a shaft 24 which may be held in a fixed position or which may be driven, and with pedestal 23 mounting a shaft 25 which is capable of axial movement within the bearing formed as part of the pedestal 23. An expandable annular tube 27 is positioned on a metal type mounting 28 which has opposed flanges 29 to hold the annular tube in position. The annular tube is constructed of a resiliently deformable material and it will be noted that the inner circumferentially extending surface of the annular tube engages the mounting 28 and the outer circumferentially extending surface is free to expand outwardly when fluid pressure is introduced into the tube through a fluid inlet 30. Shaft 25 on the opposed pedestal 23 serves to mount an annular tread mold 32 which is adapted to annularly fit around or surround the annular tube 27 when the mold 32 is moved axially to the right as seen in FIG. 1 in the direction of arrow 38. This movement is imparted by means of an air cylinder 35 which is adapted to drive a rod 36 which is attached to the tread mold 32. As seen, the annular tread mold is provided with a cavity 33 which may receive steam or other heating medium for curing of the finished tread after the same has been formed.

Figure 3:
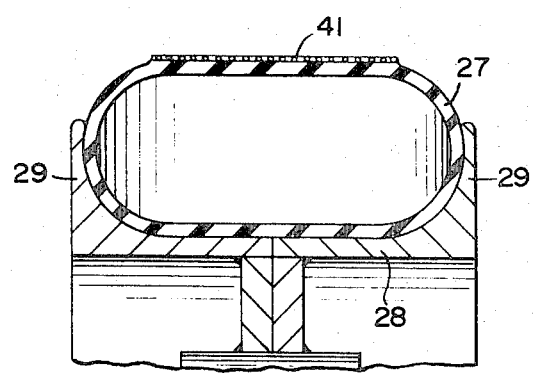
FIG. 3 is a fragmentary view in section taken in the direction of FIG. 1 and showing a breaker ply applied to the outer circumferential surface of the annular tube.
Figure 4:
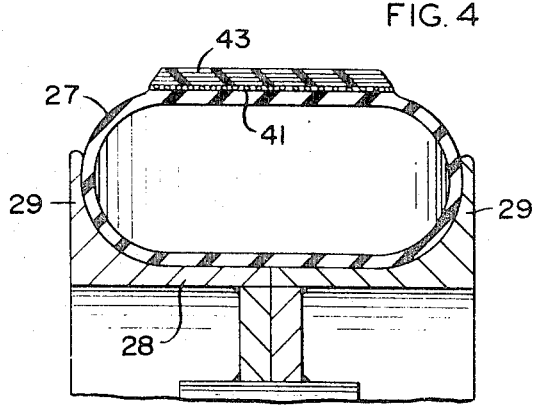
FIG. 4 is a view similar to FIG. 3 and showing an annular ribbon of tread stock material applied to the breaker shown in FIG. 3.
Figure 5:
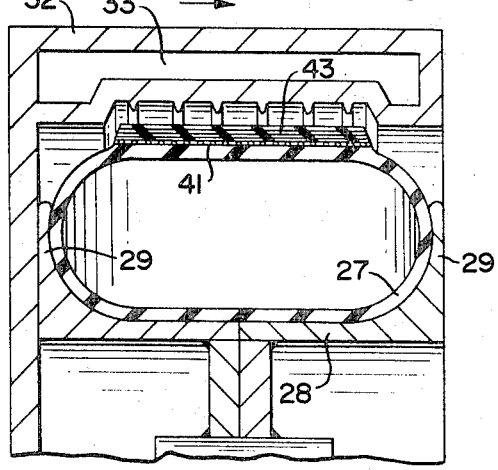
FIG. 5 is a view similar to FIGS. 3 and 4 showing the tread mold as seen in FIG. 1 moved into position to locate the same annularly about or around the tread material.
Figure 6:
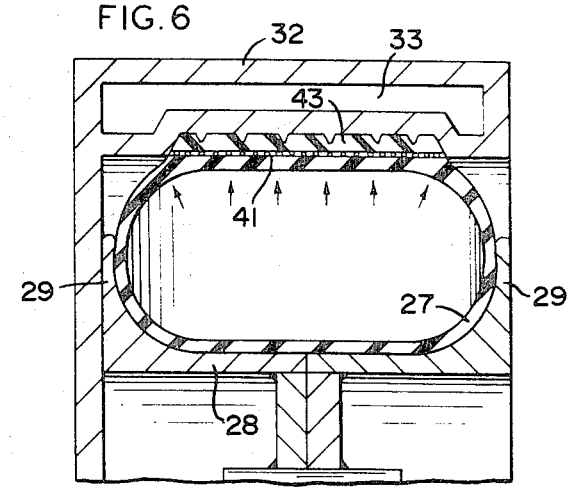
FIG. 6 is a view similar to FIGS. 3 through 5 and showing fluid pressure introduced into the annular tube so as to force the tread material into the tread mold to properly form the same.

The first step in constructing a tire in accordance with the method of the present invention, which may be excluded, when a tread for conventional purposes is being built, is illustrated in FIG. 3. This shows a breaker 41 of fabric or cord material of a construction which will be more fully described hereinafter, placed about the outer circumferentially extending surface of the annular tube 27. Since the circumferential extent of the breaker 41 will subsequently be enlarged by inflation of the annular tube 27, it is often desirable to overlap the ends of the breaker 41 to the extent that the circumference will be increased resulting in the breaker being coextensive with the inflated circumference of the tube. The next step shown is illustrated in FIG. 4 wherein a ribbon of tread material 43 is circumferentially wound about the outer circumferential surface of the annular tube 27 on top of the breaker 41. This can be accomplished by rotatively driving the shaft 24 and annular tube 27. The next step involved is shown in FIG. 5 wherein by actuation of the air cylinder 35 the annular tread mold 32 (as seen in FIG. 1) is moved to the right to the position shown in FIG. 5 wherein it immediately surrounds the ribbon of tread material 43. After the annular tread mold has been so positioned, fluid under pressure is introduced through the fluid inlet 30 into the interior of the annular tube 27 which causes the annular tube to expand, thereby forcing the ribbon of tread material into the position shown in FIG. 6 and into the annular tread mold which carries the tread design. The fluid material which is utilized in expanding the annular tube may be for example of a given temperature and might be steam or hot water or a combination of both so as to perform a curing operation on the so-formed tire tread. By the same token, a fluid heated to the proper temperature to impart a cure to the tire tread may be introduced into the cavity 33 formed in the tread mold. After the tire tread has been formed and cured the annular tread mold 32 is moved in a direction opposite to that shown in FIG. 5 and the annular tube is deflated at which time the finished tread 47 can be conveniently removed from the annular tube.

As mentioned hereinabove, this process can be conveniently utilized for making conventional tire treads which may be used, not in the further process of the present invention, but in conventional functions such as in retreading shops.

FIG. 7 discloses the next step in the process of the present invention and this involves the mechanical buffing (the buffing mechanism has not been shown) of the inner circumferential surface of the breaker 41 so as to break open the fibers or filaments 45 of the fabric or cord of which the breaker is comprised. This serves to present a fluffy velvet-like surface of these filaments or fibers and these are exposed for a purpose which will hereinafter be described. The preferred relationship of filament length to cord diameter is about 3 to 1. The degree of buffing cannot be mathematically stated except that as much surface area of the filaments should be exposed with as little destruction of the cord as possible. This is a compromise so that the strength of the breaker is not sacrificed unduly for adhesion.

Figure 8:
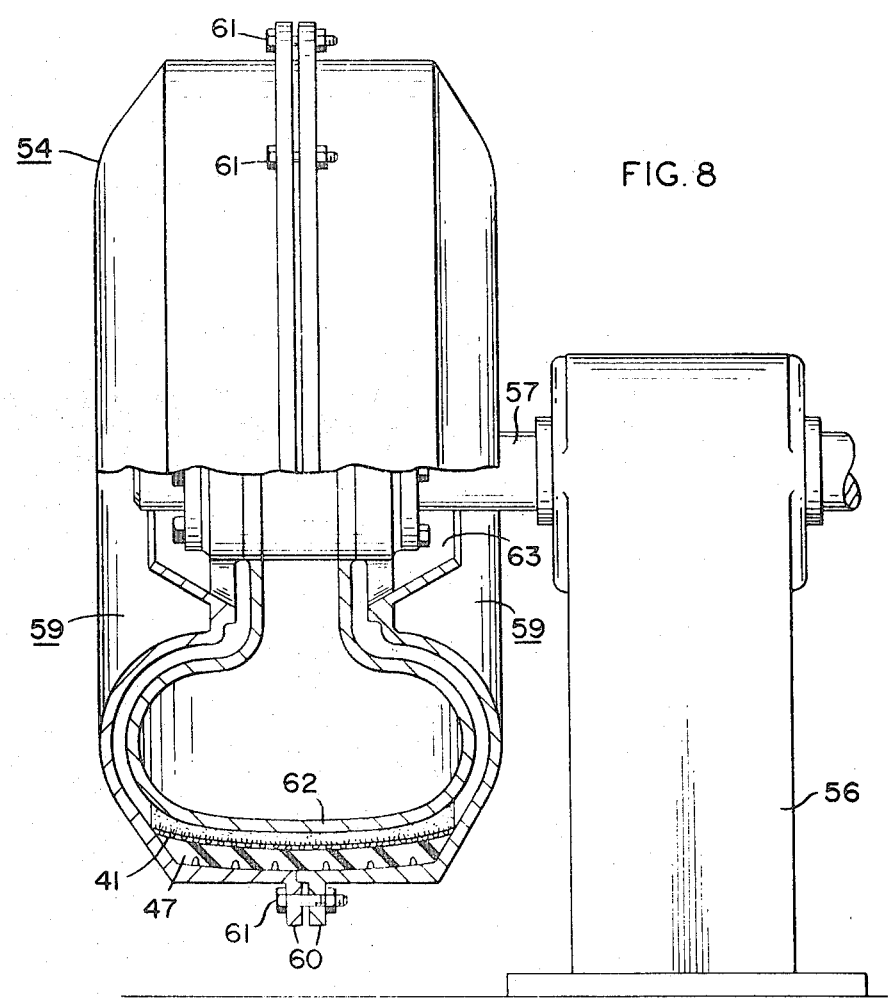
FIG. 8 is an elevational view of a centrifugal casting mold shown partially in section and with the tread of FIG. 7 placed therein.
Figure 9:
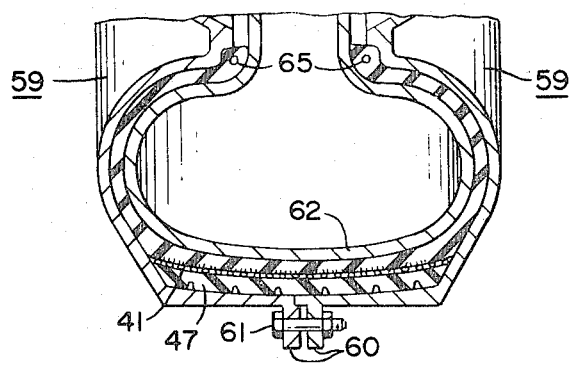
FIG. 9 is a fragmentary elevational view similar to FIG. 8 but showing a liquid polymeric material cast into the centrifugal casting mold.

FIGS. 8 and 9 disclose a centrifugal casting mold 54 which is rotatively mounted by means of a shaft 57 secured to a pedestal 56. The centrifugal casting mold comprises two sidewall members 59 which are appropriately secured to the shaft 57 and secured to each other along their circumferentially extending periphery by means of flanges 60 secured together by bolts 61. Also in a conventional manner the contrifugal casting mold includes a core 62 which serves to define the inner circumferential extent of the finished pneumatic tire. The centrifugal casting mold is adapted to have a liquid polymeric material introduced thereinto through an opening identified by the reference numeral 63. The next step in the process in the present invention and in utilizing the centrifugal casting mold 54 shown in FIGS. 8 and 9, is to place the tire tread 47 shown in FIG. 7 which has been buffed in a manner to expose the filaments or fibers of the breaker, into the centrifugal casting mold in the manner shown in FIG. 8. The centrifugal casting mold 54 is then rotated for example at speeds approaching 1000 revolutions per minute, and a castable liquid polymeric material is introduced into the mold through the opening 63 and travels to fill the space defined between the sidewall portions 59 and the core 62 to complete the finished pneumatic tire (FIG. 9). FIG. 9 indicates beads 65 of a metal construction which are initially held in position in the casting mold and which are for conventional purposes. As the liquid resinous polymeric material is introduced with the rotation of the casting mold 54 it travels to and intimately engages the buffed filaments 45 or fibers thereby intimately and securely engaging the same. It is estimated that pressures on the order of 90 p.s.i. are achieved with the mold 54 spinning at 1000 r.p.m. which drives the polymeric material into the filaments 45 and this effectively displaces entrapped air and provides the referred to intimate contact.

The resinous material which are capable of being utilized in accordance with the teachings of the present invention are practically unlimited, the principal consideration being that the resin, whatever its nature, be a liquid prior to curing. The resin must be curable and may be cured by heat, by addition of a cross-linking agent, or by catalyst, by condensation, by chemical reaction, or any combination thereof. Tires constructed in accordance with the teachings of this invention are preferably constructed with what are commonly referred to as polyurethane resins. For the most part these are of the polyether type; however, polyester-type urethanes may also be used for this purpose. The composition of these materials are well known and reference may be had for example to U.S. Pats. 2,852,483 and 2,814,605 and 2,814,606 for specific examples of polyether-polyurethanes and polyester-polyurethanes. These materials are readily available commercially as prepolymers having a viscosity comparable to that of honey. The polyester-polyurethanes generaly have specific gravities in the range of from 1.15 to 1.30. The resins of the present invention would normally be considered to be an organic compound of high molecular weight above say about 1000, containing repeating units achieved by a process encompassing any mechanism resulting in an increase in molecular weight, and including for example, polymerization, condensation, addition graft polymerization, block polymerization, cross-linking, solvation etc., or any combination thereof. The resin or resins hereof are polymeric or resinous materials in which the extent of polymerization is insufficient to convert the material from a normally liquid state to a jelled or fully cured solid state. Such curable liquid resins include therefore, prepolymers, plastisols, A and B stage resins, latently catalyzed resins, etc. The resins are in their final cured state, that is their solid state, when any of the foregoing processes of increase in molecular weight occur and such increase is terminated either by exhaustion of reactant materials, utilization of the entire amount of cross-linking agent, removal of heat, use of chain stopping reactants, or the like. As indicated above, the final cured products are preferably elastomeric, that is, in their final cured state they possess resilience or elasticity.

The polyurethane elastomers which have been described hereinabove are prepolymers which have isocyanate end groups which react readily with compounds containing active hydrogen. As a result, the breaker construction 41 as anticipated by the present invention involves the use of rayon material, nylon material and polyester type materials. Of these particular materials, rayon is the most reactive with its OH groups and nylon is somewhat less reactive, having amide groups ($CONH_2$), however, in this particular instance, good adhesion is still obtained by chemical reaction with the polyurethanes. The reactive groups on the polyester type materials are OH and COOH groups which are primarily at the ends of the chains and hence any given chain has fewer sites for bonding. It is true, however, that polyurethanes do show reasonably good adhesion to polyesters. The following is an indication of the basic reactions which take place in the above type materials of construction containing the referred to functional groups. In these reactions, R stands for the urethane prepolymer residue and R' is the fiber polymer containing the reactive groups.

REACTIONS

RNCO+R'OH→R—NH—COOR'
RNCO+R'COOH→R—NH—CO—C—COR'
RNCO+R'CONH$_2$→R—NH—CO—NH—CO—R'

Figure 10:
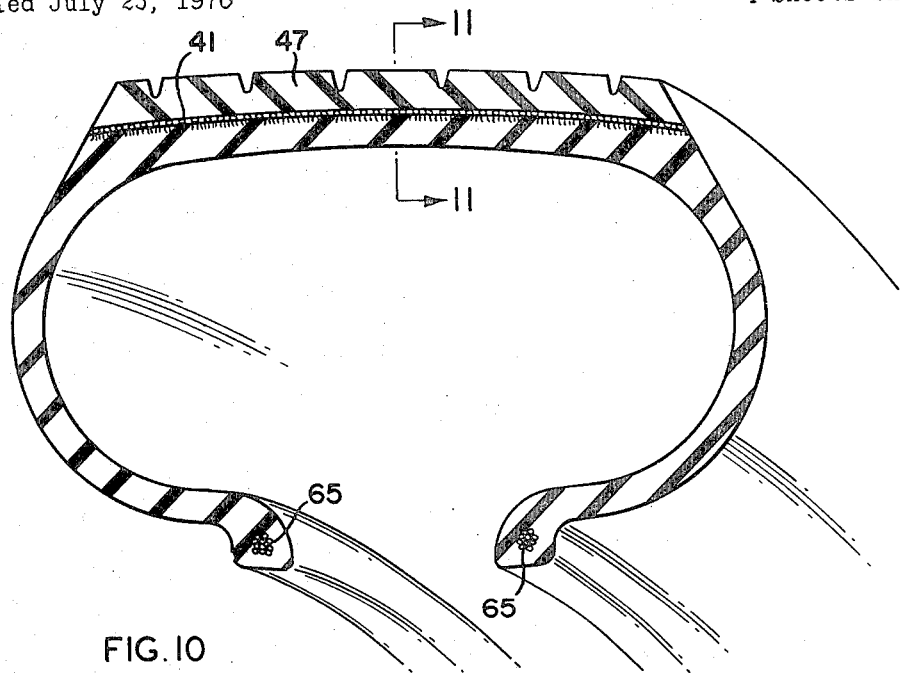
FIG. 10 is a fragmentary isometric view partially in section of the pneumatic tire produced in the mold of FIGS. 8 and 9.
Figure 11:
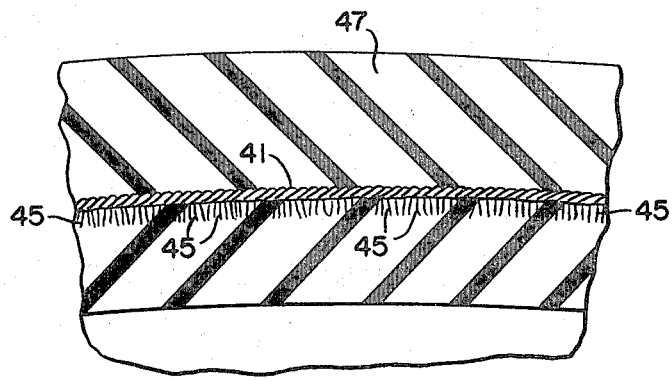
FIG. 11 is a view taken generally along the line 11—11 of FIG. 10.

It will therefore be appreciated by the action of the apparatus of FIGS. 8 and 9 and the initial curing of the polyurethane material before removal of the finished tire from the mold, that in addition to the chemical bonding accomplished, there is a mechanical bond which is created between the filaments or fibers 45 and the cured polyurethane material. FIG. 10 is a cross section through the finished tire produced in the apparatus of FIGS. 8 and 9 and FIG. 11 is an enlarged view demonstrating the mechanical bond between the material of the breaker 41 and the polyurethane material.

It will therefore be seen that the present invention accomplishes a new and unique method of constructing a tire tread and in addition discloses a unique method of connecting a conventional tire tread to a polyurethane tire carcass or carcass of similar construction. This particular bonding is accomplished by use of the intermediate breaker 41 and this provides a very uniform bond and accomplishes the function of producing a bond without taking up unnecessary space as is necessary in many of the mechanical interlocking type methods of curing conventional tread constructions to carcasses made of castable polymeric resinous materials. Additionally, and in a broader sense, the present invention discloses a unique and novel means of attaching or adhering a polyurethane to rayon, nylon or polyester cord or fabric which forms the basis for attaching the polyurethane to conventional rubber-like materials.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The process of making a pneumatic tire including the steps of preparing a pneumatic tire tread of conventional tread stock which tread has an outer surface for engaging the road in a finished tire and which also has an inner surface, adhering a breaker of rayon, nylon or polyester fabric or cord to said inner surface of said tread, treating said fabric or cord to break open and expose the fibers, placing said tread with attached breaker into a mold which is formed into the shape of a pneumatic tire, introducing a liquid resinous material into said mold which forms the sidewalls and crown portion of said pneumatic tire with said liquid resinous material engaging and surrounding said exposed fibers, and curing said resinous material to produce a bond between said breaker and said resinous material.

2. The process of making a pneumatic tire including the steps of preparing a pneumatic tire tread of conventional tread stock which tread has an outer surface for engaging the rod in a finished tire and which also has an inner surface, adhering a breaker of rayon, nylon or polyester fabric or cord to said inner surface of said tread, buffing said fabric or cord to break open the fibers, placing said tread with attached breaker into a mold which is formed into the shape of a pneumatic tire, introducing a liquid polyurethane material into said mold which forms the sidewalls and crown portion of said pneumatic tire with said liquid polyurethane material engaging and surrounding said broken fibers, and curing said polyurethane material to produce a chemical and mechanical bond between said breaker and said polyurethane.

3. The process of making a pneumatic tire including the steps of preparing a pneumatic tire tread of conventional tread stock which tread has an outer surface for engaging the road in a finished tire and which also has an inner surface, adhering a breaker of rayon, nylon or polyester fabric or cord to said inner surface of said tread, buffing said fabric or cord to break open the fibers, placing said tread with attached breaker into a centrifugal mold which is formed into the shape of a pneumatic tire, introducing a liquid polyurethane material into said mold which forms the sidewalls and crown portion of said pneumatic tire and rotating the mold whereby said liquid polyurethane material engages and surrounds said broken fibers, and curing said polyurethane material to produce a chemical and mechanical bond between said breaker and said polyurethane.

References Cited
UNITED STATES PATENTS

| 1,762,830 | 6/1930 | Mather | 18—45 T X |
| 3,396,072 | 8/1968 | Wolfe | 156—125 X |
| 2,873,790 | 2/1959 | Cadwell et al. | 264—259 X |
| 3,200,180 | 8/1965 | Russ et al. | 264—102 |
| 3,553,309 | 1/1971 | Pacciarini et al. | 264—326 X |
| 2,561,573 | 7/1951 | Hovid et al. | 18—18 F UX |
| 3,118,181 | 1/1964 | Cork | 18—18 F |
| 3,164,865 | 1/1965 | Dennis et al. | 18—18 F X |

FOREIGN PATENTS

| 877,398 | 9/1961 | Great Britain | 18—45 T |

ROBERT F. WHITE, Primary Examiner

J. H. SILBAUGH, Assistant Examiner

U.S. Cl. X.R.

156—123, 154; 264—36, 251, 257, 265, 311, 315; 425—43, 127

UNITED STATES PATENT OFFICE
CERTIFICATE OF CORRECTION

Patent No. 3,775,528      Dated November 27, 1973

Inventor(s) Heinz Wilhelm Beneze

It is certified that error appears in the above-identified patent and that said Letters Patent are hereby corrected as shown below:

In Column 1, Line 21, "side-walls" should be --sidewalls--.

In Column 5, Line 22, "RNCO+R'COOH→R-NH-CO-C-COR'" should be --RNCO+R'COOH→R-NH-CO-O-COR'--.

In Column 6, Line 15, "rod" should be --road--.

Signed and sealed this 23rd day of April 1974.

(SEAL)
Attest:

EDWARD M.FLETCHER,JR.
Attesting Officer

C. MARSHALL DANN
Commissioner of Patents